United States Patent Office 2,698,254
Patented Dec. 28, 1954

2,698,254

PROCESS FOR TREATING A REACTION MIXTURE CONTAINING HYDROXYALKYL CELLULOSE AND ALKALI

Harold M. Spurlin, Marshallton, Del., assignor to Hercules Powder Company, Wilmington, Del., a corporation of Delaware No Drawing. Application March 30, 1951, Serial No. 218,533

2 Claims. (Cl. 106—197)

This invention relates to a process for treating hydroxyalkyl cellulose, for example, hydroxyethyl cellulose, containing caustic alkali to prevent degradation during storage and conserve alkali values.

The reaction product of cellulose, alkali, water, and ethylene oxide is essentially a mixture of hydroxyethyl cellulose, alkali, and water. Oxidative degradation of the hydroxyethyl cellulose by the oxygen of the air is catalyzed by the alkali. Hydroxyethyl cellulose from the reactor, if prepared from an ordinary grade of linters or wood pulp, is high in molecular weight and too insoluble to be of significant utility. Degradation of the reaction mixture by exposure to air can be effected very rapidly. For example, U. S. 2,469,764 teaches that one day's exposure at room temperature degrades a crude hydroxyethyl cellulose mixture to a range usable in the patent example. It is therefore apparent that normal conditions of storage and transportation would allow an alkali-containing crude to degrade too far to be useful. Absolute exclusion of the oxygen of the air or the elimination of the alkaline catalyst are the only preventives to chain breaking.

Now many uses of hydroxyethyl cellulose require its solvation. Except for certain highly substituted and/or low molecular weight grades of hydroxyethyl cellulose, alkali is needed to effect solution or dispersion. Hence, conservation of the alkali becomes a potent factor in the cost and hence the utility of the product.

There are two methods of handling the reaction product known to the art. In the first, the reaction product is diluted with water and sufficient alkali is added to bring the resulting solution to the desired concentration. Possible specification for such a solution might be 7–8% hydroxyethyl cellulose in 7% alkali. That such a solution degrades on standing is shown by its reduction in viscosity over a two- or three-week period, although it is said to be stable when tightly stoppered and kept in the dark. A serious economic objection to this approach is the necessity of shipping a product which is 85% water.

In the second method, the reaction mixture is suspended in 70% methanol (70 parts methanol to 30 parts water) and neutralized with acetic acid, the resulting free hydroxyethyl cellulose being washed free of salts and acid with successive portions of 70% methanol, collected and dried. While this dry product is indefinitely stable, the method wastes substantial quantities of alkali because the substantial amounts originally present are lost and redispersion by the customer in even more alkali than was present in the reaction mixture may be required. Moreover, even in 70% methanol, a certain soluble portion of the hydroxyethyl cellulose is lost.

In accordance with this invention, a simpler, more economical treatment of this reaction product or similar reaction products containing other hydroxyalkyl celluloses circumvents the objections to the above methods; namely, at least partial neutralization of the alkali present with carbon dioxile. Preferably, carbon dioxide is added until there is substantially no free alkali present. The mixture resulting from such a treatment comprises hydroxyethyl cellulose (or other hydroxyalkyl cellulose), water, sodium carbonate, and sodium bicarbonate. Because the free alkali content of the reaction product is at least substantially reduced, the hydroxyalkyl cellulose is much less subject to oxidative chain breaking. Storage over reasonable periods and shipment are possible with no further processing except a possible evaporation of water to produce a dry mixture. It is easily made ready for use by the addition of an appropriate metal oxide or hydroxide to react with the carbonate present and the addition of water and alkali sufficient to obtain solutions of the desired concentration.

Having described the invention broadly, hereinafter the invention will be described in terms of a specific hydroxyalkyl cellulose, namely, hydroxyethyl cellulose. It is to be understood, however, that the invention may be used to prevent undue degradation of any hydroxyalkyl cellulose, such as 2-hydroxypropyl cellulose and 2-hydroxybutyl cellulose, containing free alkali. The following specific example will serve to point out how the broad principles of the invention may be utilized. All parts and percentages are by weight unless otherwise indicated.

EXAMPLE

Following the teachings of U. S. 2,469,764, a crude reaction mixture was prepared from 530 parts wood pulp (6% moisture)
1,000 parts of 30% alkali
4 parts chlorine
100 parts ethylene oxide
10 parts of a 25% aqueous solution of the sodium salt of 2-ethyl-hex-1-enesulfonic acid Chlorine was added as a viscosity regulator in place of the air degradation after formation of the hydroxyethyl cellulose.

A 75-gram portion of the reaction mixture was made up to 7.5% hydroxyethyl cellulose and 7% sodium hydroxide in water and was designated Sample 1. This solution was allowed to stand one day and the viscosity was measured. In two weeks the viscosity of the solution was measured again.

Another portion was removed from the reaction mixture, suspended in 70% methanol, acidified with acetic acid to the phenolphthalein end point and then washed with successive portions of 70% methanol until essentially ash free. It was designated Sample 2. Part of this lot was used for analytical determinations. By analysis the hydroxyethyl content was shown to be 12.8%, which is equivalent to a degree of substitution of 0.378 hydroxyethyl group per anhydroglucose unit. The remainder of this sample not used for the analytical determinations was stored for two weeks, then was made up to 7.5% hydroxyethyl cellulose and 7% sodium hydroxide in water. The solution was allowed to stand one day and the viscosity was measured.

The pressure within the vessel containing the remainder of the reaction mixture was readjusted to 8 inches of mercury (absolute) and the charge was agitated as carbon dioxide was admitted to the bottle. After about 30 to 45 minutes, no further rapid absorption was noted and the bottle was allowed to stand 36 hours in an atmosphere of carbon dioxide. This material was designated Sample 3. The following analytical data were obtained for this sample:

| | Percent |
|---|---|
| Hydroxyethyl cellulose | 29.0 |
| Moisture | 51.6 |
| $Na_2CO_3$ | 6.1 |
| $NaHCO_3$ | 13.5 |
| | 100.2 |

Sample 3 was stored for two weeks, then half was designated as 3A and made up to 7.5% hydroxyethyl cellulose and 7% sodium hydroxide in water by the addition of water and sodium hydroxide. The other half of Sample 3 was designated 3B and was made up to 7.5% hydroxyethyl cellulose and 7% sodium hydroxide in water by adding water to the stored material, regenerating the original alkali values by adding lime, and then adding the additional requisite amount of sodium hydroxide. After standing for one day, the viscosity of both samples was measured to determine the degradation during the storage period.

The viscosities of all the samples appear in Table 1. The period of one day before measurement was allowed to elapse so as to permit air entrapped in the solution during solvation to escape. Thus, the viscosities of the solution on the spindle represented true solution viscosities. All viscosity determinations were made on solutions containing 7.5% hydroxyethyl cellulose and 7% sodium hydroxide with a Brookfield viscometer. A No. 4 spindle was used at 30 r. p. m.

*Table 1*

| Sample No. | | Viscosity* |
|---|---|---|
| 1 | Crude | 6,300 |
| 1 | Crude (in solution 2 weeks) | 2,600 |
| 2 | Acidified, washed, and dried | 6,300 |
| 3A | $CO_2$ neutralized, then aged 2 weeks | 5,840 |
| 3B | $CO_2$ neutralized, aged, made up with lime and alkali. | 6,500 |

*All viscosities, except the second, were measured on a solution 1-day old.

Precipitated calcium carbonate in the amounts encountered here has no measurable effect on the viscosity of the hydroxyethyl cellulose solutions. The viscosity measurements listed above are comparable and represent true differences in chain length.

From these results it can be seen that neutralization with carbon dioxide (Samples 3A and 3B) prevents degradative oxidation fully as effectively as either of the processes of the prior art (Samples 1 and 2). In fact, they show great improvement in degradation control over the dilution method of the prior art (Sample 1).

Moreover, the carbon dioxide process prevents this degradation without the necessity of excessive watering which would increase shipping costs and problems, and also eliminates the loss of hydroxyethyl cellulose and alkali values as well as the expense of washing with methanol which are attendant on the prior art acidification method.

The carbon dioxide treatment of the invention may be used to prevent oxidative degradation in the reaction mixtures of any of the known alkaline processes for producing hydroxyethyl cellulose, for example, the dough process of U. S. 1,502,379 and the slurry process of U. S. 2,135,128 in addition to the dry alkaline process of U. S. 2,469,764. In the slurry process an inert organic medium will also be present, but this takes no part in the reactions and its presence is immaterial for the purposes of this invention.

Any method of adding carbon dioxide may be used. Thus, the carbon dioxide may be bubbled through the reaction mixture, the reaction mixture may be stirred or tumbled in an atmosphere of carbon dioxide and the like. With respect to extent of neutralization, it is significant that the rate of degradation of the hydroxyethyl cellulose is a function of the concentration of the alkali. Where the hydroxyethyl cellulose is to be used within a relatively short time, it is possible to achieve sufficient stabilization thereof by using only the $CO_2$ necessary to lower substantially the original alkali concentration of the crude hydroxyethyl cellulose. Hence, it is within the broad scope of this invention to pass $CO_2$ into a crude hydroxyethyl cellulose containing alkali to reduce substantially the free alkali content. It is preferred, however, in accordance with this invention, to pass in $CO_2$ until there is substantially no free alkali present. While as normally operated it is sufficient to neutralize the crude hydroxyethyl cellulose only to the point that substantially no free alkali is present, it is sometimes desirable to carry the neutralization somewhat further. The most preferred procedure is to pass in $CO_2$ until not only all the alkali has been neutralized but also a substantial amount of the alkali has been converted in the bicarbonate. The method of adding oxide or hydroxide to regenerate the alkali is immaterial.

Any metal oxide or hydroxide that will precipitate as the carbonate from an aqueous alkali carbonate solution while regenerating caustic alkali may be used to regenerate the alkali. While any compound that is in this class is technically operable, lime is preferred. Other suitable compounds are the oxides or hydroxides of barium and strontium. The factor of importance here is that the hydroxide of the metal should have some slight solubility so that it can react in solution and that its carbonate have a low solubility relative to its hydroxide. It is to be noted that the color of the precipitated carbonates of the above metals is white, which makes them desirable pigmenting agents for some uses of the hydroxyethyl cellulose.

The carbonates need not be precipitated, however. A strong base may be added to the reaction mixture to dissolve the hydroxyethyl cellulose. Any strong base, organic or inorganic, may be used. Among those that may be so used are tetramethylammonium hydroxide, sodium hydroxide, tetraethylammonium hydroxide, potassium hydroxide, etc.

The particular method and reactant used will depend on the use to which the hydroxyethyl cellulose is to be put.

Reaction mixtures preserved by the method of this invention have at least as good protection against viscosity drop due to oxidative degradation as could be obtained in either of the processes known to the prior art. As compared with the dilution process of the prior art, the instant process affords considerably better protection against viscosity drop due to oxidative degradation. In addition, the product of this invention is easier to handle, costs less to ship, and is easier to store for extended periods (i. e., need not be hermetically sealed and kept in the dark) than is the product of the watering process of the prior art. Compared to the prior art acidification method, the process of this invention conserves hydroxyethyl cellulose, eliminates washing with methanol, and conserves alkali values.

The term "alkali" as used herein and in the claims is used in the strict sense to mean the hydroxides of the alkali metals.

What I claim and desire to protect by Letters Patent is:

1. A process for treating a reaction mixture containing a hydroxyalkyl cellulose and alkali to prevent degradation during retention for subsequent use over a reasonable period of time and conserve alkali values which comprises passing carbon dioxide into the said reaction mixture containing hydroxyalkyl cellulose and alkali until the free alkali is substantially converted to carbonate and bicarbonate, permitting the alkali to remain in the form of carbonate and bicarbonate during such retention for subsequent use, and then regenerating the said alkali by adding a compound selected from the group consisting of the oxides and hydroxides of calcium, strontium, and barium and mixtures thereof to causticize the carbonate and bicarbonate.

2. A process in accordance with claim 1 wherein the hydroxyalkyl cellulose is hydroxyethyl cellulose.

References Cited in the file of this patent

UNITED STATES PATENTS

| Number | Name | Date |
|---|---|---|
| 1,983,349 | Dreyfus | Dec. 4, 1934 |
| 2,447,757 | Lilienfeld | Aug. 24, 1948 |
| 2,553,725 | Rogers et al. | May 22, 1951 |

FOREIGN PATENTS

| Number | Country | Date |
|---|---|---|
| 383,611 | Great Britain | Of 1932 |